Nov. 4, 1958
M. R. SOMMERIA
2,859,399
CONTROL SYSTEM
Filed Sept. 30, 1955
2 Sheets-Sheet 2
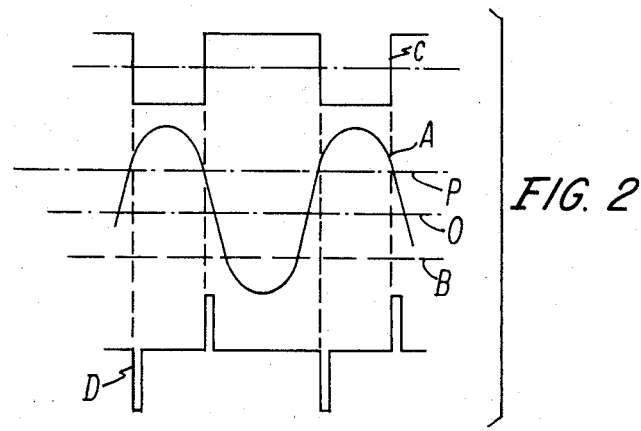
FIG. 2
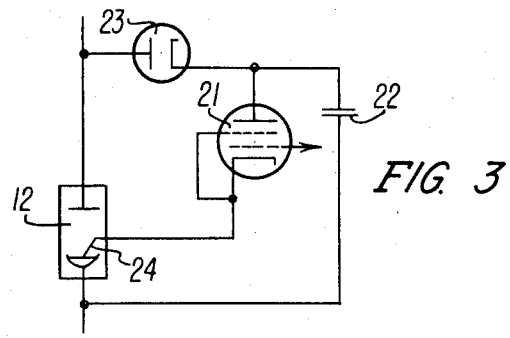
FIG. 3
FIG. 4
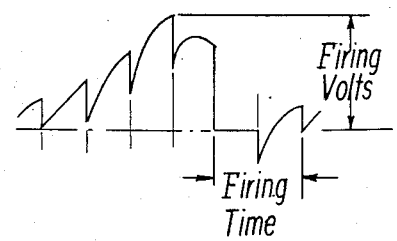
FIG. 5
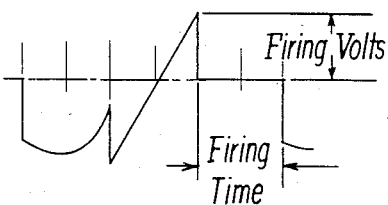
INVENTOR.
Marcel R. Sommeria
BY
Mueller and Aichele
Attys.

United States Patent Office 2,859,399
Patented Nov. 4, 1958

2,859,399

CONTROL SYSTEM

Marcel R. Sommeria, Palos Heights, Ill., assignor to Welding Research, Inc., Chicago, Ill., a corporation of Illinois Application September 30, 1955, Serial No. 537,667

15 Claims. (Cl. 321—38)

This invention relates generally to systems for operating direct current equipment from alternating current sources, and more particularly to a system for providing a controlled direct current from a three-phase alternating current source.

There are many applications in which it is desired to operate direct current equipment from alternating current sources. As an example, in order to provide precise motor speed control it may be necessary to use a direct current motor. In a particular application it may be desired to drive the direct current current motor from an available three-phase power source. Another application is in welding machines wherein accurate control of direct current pulses is required.

To provide direct current from alternating current sources, rectifier systems using rectifier elements such as ignitrons have been used. By providing a pair of such elements connected in opposite polarities to each phase of a source efficient conversion may be provided.

Such systems in which both rectifier and inverter actions take place have generally been called cycloconverters. Control of the current applied by the cycloconverter is obtained by controlling the firing times of the rectifier elements of the cycloconverter. The control circuit must provide symmetrical control of the two rectifier elements connected to each phase, and must provide control of the rectifier elements for the different phases which is related to the phase being controlled. Such control systems have been relatively complex and have not been easily adaptable to various applications. Further, these controls have required relatively large amounts of energy to provide the controlling action.

It is therefore an object of the present invention to provide an improved control circuit for a cycloconverter rectifier system.

A further object of the invention is to provide an improved system for firing ignitron type rectifier elements which insures the desired action by using a minimum of energy.

Another object of the invention is to provide a simplified system for producing pulses of opposite polarity which may be varied symmetrically with respect to a center point in accordance with a control voltage.

A feature of the invention is the provision of a circuit for producing symmetrically displaced pulses wherein a sine wave is superimposed on a direct current voltage with the amount of direct current symmetrically changing the spacing of the zero voltage points with respect to the points of maximum voltage, and with the zero voltage points providing the timing for control pulses. This may be accomplished by converting the displaced sine wave to a square wave having the same crossover points and differentiating the square wave to produce pulses of alternately opposite polarity which may be used to control the opposite polarity rectifiers of each phase of the cycloconverter.

A further feature of the invention is the provision of an improved ignitron firing circuit wherein a thyratron is connected to the control element of the ignitron to initiate firing thereof, and a condenser and rectifier are bridged across the ignitron with the rectifier having the polarity to cause the condenser to charge when the ignitron is not conducting. The thyratron, when rendered conducting causes the condenser to discharge to increase the firing current so that the ignitron conducts more rapidly when the controlling thyratron conducts.

A further feature of the invention is the provision of an improved coupling circuit for thyratrons used to control the conductivity of ignitrons, wherein the controlling pulse is applied through a condenser which charges to produce a bias to hold the thyratron cut off until the next controlling pulse is received, with the condenser discharging through a rectifier to condition the circuit for the next pulse. This circuit prevents undesired conduction of the thyratrons.

Further objects, features and the attending advantages of the invention will be apparent from a consideration of the following description when taken in connection with the accompanying drawings wherein:

Fig. 2 is a curve chart illustrating the operation of the circuit for providing pulses of opposite polarity symmetrically displaced in phase;

Fig. 3 illustrates the ignitron firing circuit; and

Figs. 4 and 5 illustrate the operation of the circuit of Fig. 3.

Figure 1:
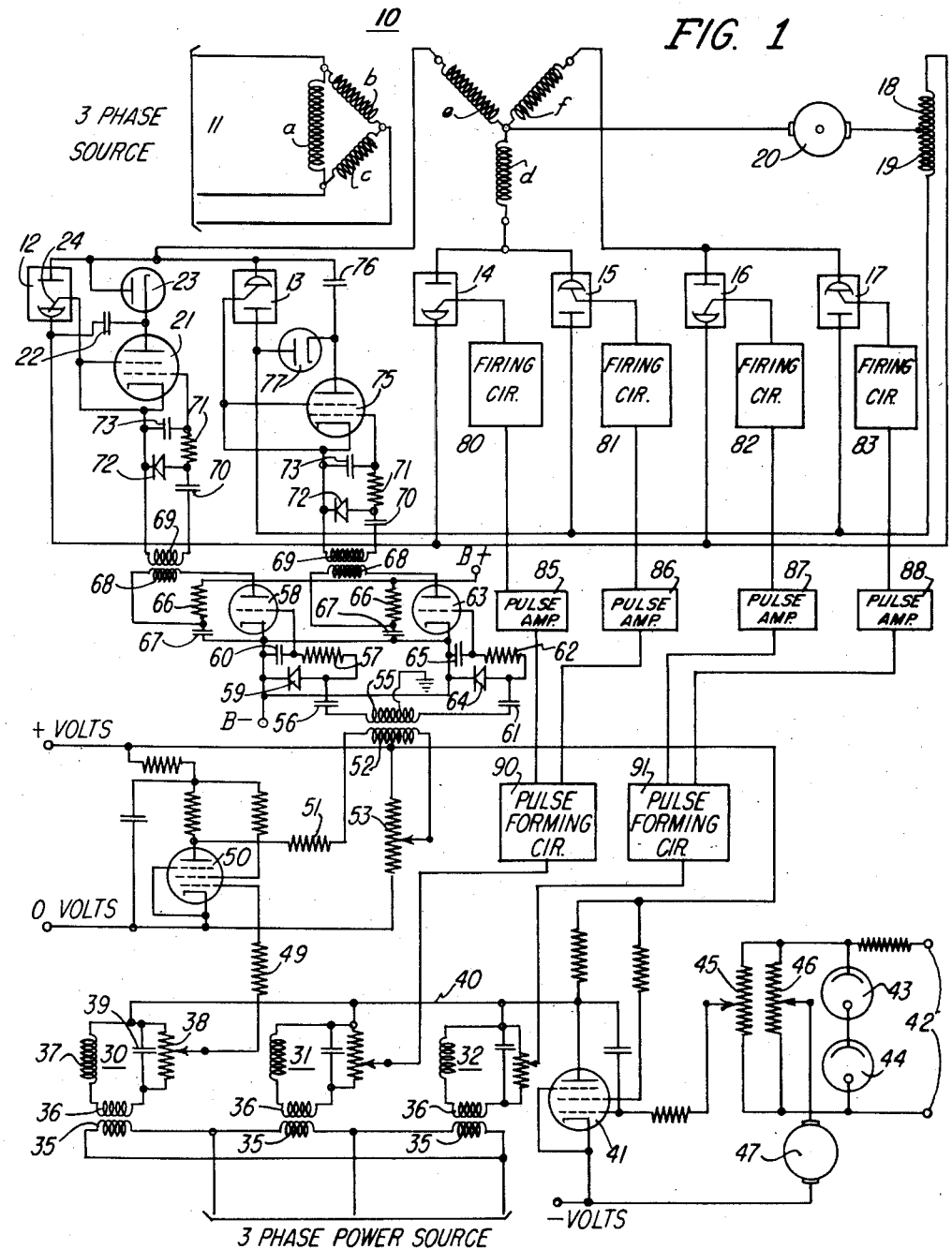
Fig. 1 is a schematic diagram illustrating the improved rectifying system in accordance with the invention.

In practicing the invention there is provided a rectifier circuit of the cycloconverter type wherein a direct current load is supplied from a three-phase alternating current source through rectifier elements connected in opposite polarity to each phase of the source. Firing circuits are provided for the rectifier elements including a control tube connected to the control element of the ignitron to provide timed firing thereof, and an auxiliary condenser and rectifier which tend to increase the firing current. The control tubes of the various firing circuits are rendered conducting by pulses of opposite polarity symmetrically shifted with respect to a center point of the wave, with the shift being controlled by a direct current voltage. The shifted pulses may be produced by shifting the direct current axis of a sine wave and producing pulses at the crossover point of the shifted wave. The pulses may be produced by converting the sine wave to a pulse wave and then differentiating the pulse wave as by use of a saturated transformer to provide pulses of opposite polarity as the square wave changes amplitude. The pulses of opposite polarity are applied to the rectifier elements of opposite polarity of each phase of the cycloconverter, with a separate control circuit being required for each phase. The control voltage which shifts the phase of the pulses may vary in accordance with the operation of the energized equipment, such as with the speed of a motor, or in accordance with a predetermined pattern such as a pilot wave used for welding operations.

Referring now to the drawings, in Fig. 1 there is illustrated a three-phase transformer structure 10 connected to the three-phase source 11. The transformer 10 has the primary windings designated a, b and c connected in delta, and the secondary windings designated d, e and f connected in Y. Connected in series with each secondary winding are a pair of rectifiers of the ignitron type with these rectifier elements being designated 12 to 17 inclusive. Rectifier elements 12, 14 and 16, which are connected in the same polarity, are connected in series with inductor 18 to the direct current load which is represented as a motor 20. Similarly, rectifier elements 13, 15 and 17, which are of the same polarity as each other, are connected through inductor 19 to the motor 20. Inductors 18 and 19 may be formed by a single inductor having a center tap. The other side of the motor is connected to the three-phase transformer and is at the neutral potential of the three-phase source.

For rendering each rectifier element conducting, a firing circuit is provided including electron tube 21 which may be of the thyratron type, a condenser 22 and a diode rectifier 23. The condenser 22 and the diode 23 are effectively connected across the rectifying electrodes of the ignitron elements. The diode 23 causes the condenser 22 to charge to build up a voltage which is used to render the ignitron conducting. For actually triggering the ignitron, the electron tube 21 is provided and is connected to the control element 24 of the ignitron. The electron valve 21 is connected in a control circuit which controls the time of firing of the ignitron rectifier elements and thereby controls the supply of current to the direct current load. The firing circuit will be described more in detail hereafter.

Referring now to the control circuit for the firing circuits, three separate control circuits are required, one fo each phase of the three-phase source, and with each control circuit controlling both the rectifier elements during both the rectification and the inverter action of the cycloconverter system. The control circuit includes resonant circuits 30, 31, and 32 connected to the three-phase source for providing waves of accurately sinusoidal wave form. This is necessary since the currents drawn from the various phases of the source vary, and accordingly the wave form of the source may be distorted. The resonant circuits are fed by transformers having primary windings 35 connected directly to the source 11 and secondary windings 36 connected in the series resonant circuits. The transformers including the windings 35 and 36 may be designed to provide the desired input voltage level to the resonant circuit. The resonant circuit includes inductor 37 and condenser 39 tuned to the frequency of the source so that a sine wave is developed therein. A selected portion of this sine wave may be derived from potentiometer 38 connected across condenser 39.

Also applied to the resonant circuits 30 to 32 is a direct current voltage applied through conductor 40. This voltage is controlled by the pentode tube 41 which functions as an amplifier. The input to the pentode 41 is provided by a network including a source 42 of relatively high potential having voltage regulators 43 and 44 connected thereto so that the voltage is maintained at a very precise value. Potentiometers 45 and 46 are connected across the source and connected respectively to the grid and cathode of the tube 41. By setting the potentiometers 45 and 46 in a corresponding manner no voltage will be applied from the source 42 to the input circuit of the tube 41. It is apparent that by changing the position of the taps of the potentiometers any desired bias may be provided within the limits of the source 42 and may be of either positive or negative polarity. Connected between the potentiometer 46 and the cathode of the tube 41 is a control device 47 which may apply a varying potential to the cathode. For example if the system is to be used for providing operation of the motor 20 at constant speed, the element 47 may be a tachometer which provides a voltage varying with the speed to thereby change the input voltage to the tube 41. Alternately the control device 47 may provide a voltage corresponding to the current desired in the direct current load and this will operate through the control system to control the cycloconverter to provide the desired current.

Considering now the operation of the control circuit, reference is made to Fig. 2. The sine wave A represents the sine wave component developed by the series resonant circuit and derived from the potentiometer 38. The dotted line B represents the direct current at conductor 40 with respect to the center line O. Accordingly, the voltage obtained from the movable tap on potentiometer 38 is a composite of the direct current and sine wave components and has the effect of shifting the zero potential axis of the curve A. Accordingly, the curve A may be considered to be varying from the new center line P.

Returning to Fig. 1, the voltage derived from potentiometer 38 is applied through resistor 49 to the amplifier 50. The amplifier 50 is biased to function as a saturated amplifier so that the conductive state thereof will change very suddenly as the voltage applied to the grid thereof swings from positive to negative. Accordingly, the output voltage will have very steep rising and falling portions providing substantially a square wave as illustrated by the curve C of Fig. 2. This output voltage is developed across resistor 51 and coupling transformer 52 which is connected to a potentiometer 53 connected across a direct current source.

The coupling transformer 52 is of such construction that the direct current potential applied thereto from the potentiometer 53 may be adjusted so that the transformer is saturated and only a very short pulse of voltage is transferred thereby. This results in a differentiating effect as shown by the curve D of Fig. 2. Negative pulses are produced when the square wave amplitude drops and positive pulses are produced when the square wave amplitude rises. These pulses are symmetrically spaced with respect to a recurring center point which is at the maximum points of the sine wave A. It is apparent that by changing the direct current voltage the position at which the sine wave crosses the zero axis changes to thereby shift the displacement of the positive and negative pulses with respect to this center point.

The secondary winding 55 of the saturated coupling transformer 52 has a center tap connected to ground and is wound so that the positive pulses are applied through condenser 56 and resistor 57 to the triode pulse amplifier 58 to render the same conducting. The condenser 56 charges when the pulse is applied to provide a holdoff voltage so that the tube 58 is positively cut off when the pulse ceases. The charge on condenser 56 is gradually removed through the rectifier 59 so that when a further voltage pulse is applied from the transformer 55, the tube is again in condition to conduct. The condenser 60 neutralizes plate-to-grid capacitance of the triode.

Because of the polarity of the transformer and the ground center connection thereof, negative pulses in the primary of the transformer 52 will appear at the end of the secondary 55 connected to condenser 61 as positive pulses. These pulses are applied through resistor 62 to the grid of triode 63 in the same manner that pulses are applied to the grid of triode 58. The condenser 61 charges to hold off the triode 63, and then discharges through rectifier 64 between pulses. Condenser 65 is for neutralization as previously described. The output circuits of the triodes 58 and 63 include resistors 66 and condenser 67 connected across the B plus potential. This causes the condensers 67 to charge to a positive value. When the tube conducts, the condensers discharge through the primary windings 68 of the coupling transformers. Actually an oscillation takes place when each condenser 67 discharges so that the plate of the triode connected thereto becomes negative and conduction immediately ceases. The tubes then remain inactive until again rendered conducting by the next pulse applied to the grid.

The pulses developed in the primary winding 68 of the coupling transformer are applied to the secondary winding 69 and through condenser 70 and resistor 71 to the control grid of the thyratron tube 21. This circuit acts in the same manner as the input circuit to the pulse amplifiers, with the condenser 70 charging to provide a holdoff voltage. The charge on condenser 70 is removed by rectifier 72 to condition the circuit for the next pulse.

Condenser 73 provides neutralization in the manner previously described.

A firing circuit including thyratron 75, condenser 76 and diode 77 control firing of the ignitron 13. It will be apparent that this firing circuit is the same as the circuit for the ignitron 12. Pulses from the associated transformer primary winding 68 are applied through secondary winding 69, condenser 70 and resistor 71 as described with respect to the previous circuit. Similarly, rectifier 72 and condenser 73 operate in a manner previously described.

In Fig. 3 there is shown the firing circuit of one ignitron such as the ignitron 12. As previously stated the condenser 22 charges through diode 23 from the potential applied across the ignitron. When the thyratron fires by action of the pulse applied to the grid thereof current will flow through the diode 23 and the thyratron to the ignitron control electrode 24 to tend to render the ignitron conducting. At the same time, the condenser 22 discharges through the thyratron to increase the current applied to the ignitron control electrode 24. This provides a sufficient current to cause the ignitron 12 to start conducting. The action of condenser 22 is particularly important during inverter action as the voltage across the ignitron may be very low. However, as inverter action always follows the maximum voltage from the source, the condenser 22 will be charged to this maximum value. Accordingly, the discharge of the condenser 22 through the thyratron 21 will cause the ignitron to fire even though the voltage across the ignitron is quite low.

Fig. 4 illustrates the action in the firing circuit during inverter action and Fig. 5 illustrates the action therein during rectifier action. These curves are taken from oscillograms and show the voltage across an ignitron during a complete cycle which is made up of six parts. The curves show the action when the phase shift is 60° from the zero position and provide firing of the inverter and the rectifier during one third of the complete cycle.

In Fig. 1 the details of the pulse forming circuit and of the coupling pulse amplifiers and the firing circuits are shown for only one phase. The boxes 80, 81, 82 and 83 represent pulse firing circuits for the ignitrons 14, 15, 16 and 17 respectively, which may be identical to the firing circuits shown for ignitrons 12 and 13. Similarly, boxes 85, 86, 87 and 88 represent pulse amplifiers which may be identical to the pulse amplifiers including the triodes 58 and 63 which are illustrated. The pulse forming circuits represented by boxes 90 and 91 may be identical to the pulse forming circuit including the tube 50 and are fed from the other phases of the source supplied through resonant circuits 31 and 32 respectively. Since these circuits are all the same as the circuit illustrated these circuits are not shown in detail.

It will be apparent that the ignitrons are controlled so that current is supplied therefrom in accordance with the direct current voltage applied to conductor 40 of the pulse producing network. This voltage 40 may be provided in various different manners as has previously been stated. Accordingly, the system is readily adaptable for use in many applications since it is merely necessary to provide a D. C. control voltage for controlling the direct current applied to an equipment energized from a three-phase alternating current source. The system operates very rapidly to provide highly responsive control. As an example, the system could be used in a welding system such as shown in my copending application Serial No. 293,121 filed June 12, 1952, now Patent 2,776,399.

I claim:

1. A system for producing a controlled direct current voltage from a three phase power source including in combination, rectifier means including a pair of rectifier elements connected to each phase of said source with the elements of each pair being connected in opposite polarities, inductor means connecting said rectifier elements to direct current output means, said rectifier elements including control portions for controlling the conductivity thereof, and control means connected to said control portions of said rectifier elements to control the current applied through said rectifier elements to said output means, said control means including a firing circuit connected to each rectifier control portion including an electron discharge valve, a condenser, and a circuit for charging said condenser from the power source, and a control circuit for selectively rendering said discharge valves of said firing circuit conducting, said control circuit including pulse developing means connected to each phase of the source for providing recurring pulses of opposite polarity symmetrically shifted in phase with respect to a regularly recurring center point, said pulse developing means connected to each phase providing pulses of opposite polarity to the firing circuits of rectifier elements of opposite polarity connected to the associated phase of the source, said pulses controlling the conductivity of said valves of said firing circuits so that said valves and said condensers provide current to said control portions of said rectifier elements to render the same conducting, with the shift in phase of said pulses controlling the time of firing of said rectifier elements and thereby providing instantaneous control of current at said output means.

2. A system for producing a controlled direct current voltage from a three phase power source including a pair of rectifier elements connected to each phase of said source with the elements of each pair being connected in opposite polarities, inductor means connecting said rectifier elements to direct current output means, each of said rectifier elements including first and second rectifier electrodes and a control electrode for initiating conduction between said rectifier electrodes, and control means for selectively controlling the conductivity of said rectifier elements to control the current applied therethrough to said output means, said control means including a firing circuit for each rectifier element including a condenser and a rectifier connected in series across said rectifier electrodes, and an electron discharge valve connected from said condenser to said control electrode, and a control circuit for selectively rendering said discharge valves of said firing circuit conducting, said control circuit including pulse developing means connected to each phase of the source for providing recurring pulses of opposite polarity symmetrically shifted in phase with respect to a regularly recurring center point, said pulse developing means connected to each phase of the source providing pulses of opposite polarity to the firing circuits of said rectifier elements of opposite polarity connected to the associated phase of the source, said pulses controlling the conductivity of said valves of said firing circuits so that said valves and said condensers provide current to said control portions of said rectifier elements to render the same conducting, with the shift in phase of said pulses controlling the time of firing of said rectifier elements and thereby providing instantaneous control of the current in said output means.

3. A system for producing a controlled direct current voltage from a three phase power source including in combination, rectifier means including a pair of rectifier elements connected to each phase of said source with the elements of each pair being connected in opposite polarities, inductor means for connecting said rectifier elements to direct current output means, each of said rectifier elements including first and second rectifier electrodes and a control electrode for initiating conduction between said rectifier electrodes, and control means for selectively controlling the conductivity of said rectifier elements to control the current applied therethrough to said output means, said control means including a firing circuit for each rectifier element including condenser means and rectifier means connected in series across said rectifier electrodes, and an electron discharge valve having a control grid and output electrodes with the output electrodes being connected from said condenser means to said control electrode, and a control circuit for selectively rendering said discharge valves of said firing circuits conducting, said control circuit including pulse developing means connected to each phase of the source for providing recurring pairs of pulses symmetrically shifted in phase with respect to a regularly recurring center point, said pulse developing means connected to each phase selectively providing the pulses of each pair to the firing circuits of said rectifier elements of opposite polarity connected to the associated phase of the source, each of said firing circuits including a coupling condenser connected to said control grid of said discharge valve thereof for applying pulses thereto and means for discharging said coupling condenser, said coupling condenser applying pulses to said valve for rendering the same conducting with said pulses charging said coupling condenser to hold said valve cut off, said discharging means conditioning said coupling condenser for applying the next pulse to said valve, said valves when rendered conducting discharging said condenser means and providing current to said control portions of said rectifier elements to render the same conducting, with the shift in phase of said pulses controlling the time of firing of said rectifier elements and thereby providing instantaneous control of the current in said output means.

4. A system for producing a controlled direct current voltage from a three phase power source including in combination, rectifier means including a pair of rectifier elements connected to each phase of said source with the elements of each pair being connected in opposite polarities, inductor means for connecting said rectifier elements to direct current output means, each of said rectifier elements including first and second rectifier electrodes and a control electrode for initiating conduction between said rectifier electrodes, and control means for selectively controlling the conductivity of said rectifier elements to control the current applied therethrough to said output means, said control means including a firing circuit for each rectifier element including condenser means and rectifier means connected in series across said rectifier electrodes, and an electron discharge valve having a control grid and output electrodes with the output electrodes connected from said condenser means to said control electrode, and a control circuit for selectively rendering said discharge valves of said firing circuits conducting, including means for applying pulses to said control grids thereof, each of said firing circuits including a coupling condenser connected to said control grid of said discharge valve thereof for applying pulses thereto and means for discharging said coupling condenser, said coupling condenser applying pulses to said valve for rendering the same conducting with said pulses charging said coupling condenser to hold said valve cut off, said discharging means conditioning said coupling condenser for applying the next pulse to said valve, said valves when rendered conducting discharging said condenser means and providing current to said control portions of said rectifier elements to control the time of firing of said rectifier elements and thereby providing control of the current in said output means.

5. A system for producing a controlled direct current voltage from a three phase power source including a pair of rectifier elements connected to each phase of said source with the elements of each pair being connected in opposite polarities, inductor means connecting said rectifier elements to direct current output means, each of said rectifier elements including first and second rectifier electrodes and a control electrode for initiating conduction between said rectifier electrodes, and control means for selectively controlling the conductivity of said rectifier elements to control the current applied therethrough to said output means, said control means including a firing circuit for each rectifier element including a condenser and a rectifier connected in series across said rectifier electrodes, and an electron discharge valve connected from said condenser to said control electrode, and a control circuit for selectively rendering said discharge valves of said firing circuits conducting, said control circuit including pulse developing means connected to each phase of the source for providing recurring pulses of opposite polarity symmetrically shifted in phase with respect to a regularly recurring center point, said pulse developing means connected to each phase of said source including means for providing from the voltage of the source a voltage wave of sinusoidal wave form, means for providing a direct current voltage which varies with the phase shift desired, means for providing a composite wave including said sinusoidal wave and said direct current voltage with the zero voltage points of said composite wave varying with the direct current voltage, means for providing a square wave having alternate portions corresponding in time to the positive and negative portions of said composite wave, differentiating means for producing positive and negative pulses as the square wave rises and falls respectively, with the positive and negative pulses being symmetrically shifted from the center point as the direct current voltage varies, and means for applying said pulses of opposite polarity to the firing circuits of said rectifier elements of opposite polarity connected to the associated phase of the source, said pulses controlling the conductivity of said valves of said firing circuits so that said valves and said condensers providing current to said control portions of said rectifier elements to render the same conducting, with the shift in phase of said pulses controlling the time of firing of said rectifier elements and thereby providing instantaneous control of the current in said output means.

6. A system for producing a controlled direct current voltage from a three phase power source including a pair of rectifier elements connected to each phase of said source with the elements of each pair being connected in opposite polarities, inductor means connecting said rectifier elements to direct current output means, each of said rectifier elements including first and second rectifier electrodes and a control electrode for initiating conduction between said rectifier electrodes, and control means for selectively controlling the conductivity of said rectifier elements to control the current applied therethrough to said output means, said control means including a firing circuit for each rectifier element including a condenser and a rectifier connected in series across said rectifier electrodes, and an electron discharge valve connected from said condenser to said control electrode, and a control circuit for selectively rendering said discharge valves of said firing circuits conducting, said control circuit including pulse developing means connected to each phase of the source for providing recurring pulses of opposite polarity symmetrically shifted in phase with respect to a regularly recurring center point, said pulse developing means connected to each phase of said source including means for providing from the voltage of the source a voltage wave of sinusoidal wave form, means for providing a direct current voltage which varies with the phase shift desired, means for superimposing said sinusoidal wave on said direct current voltage to provide a composite wave having points of zero voltage which vary with said direct current voltage, a saturated amplifier having a grid and being biased to be rendered respectively conducting and non-conducting as the voltage applied to said grid passed from positive to negative through a very small voltage range, means for applying said composite wave to said grid of said saturated amplifier so that a square wave output is produced with the relative duration of the portions of different amplitudes varying with said direct current voltage, a saturated transformer connected to the output of said saturated amplifier for producing positive and negative pulses as the square wave rises and falls respectively, and means for applying said pulses of opposite polarity to the firing circuits of said rectifier elements of opposite polarity connected to the associated phase of the source, said pulses controlling the conductivity of said valves of said firing circuits so that said valves and said condensers providing current to said control portions of said rectifier elements to render the same conducting, with the shift in phase of said pulses controlling the time of firing of said rectifier elements and thereby providing instantaneous control of the current in said output means.

7. A system for producing a controlled direct current voltage from a three phase power source including a pair of rectifier elements connected to each phase of said source with the elements of each pair being connected in opposite polarities, inductor means connecting said rectifier elements to direct current output means, each of said rectifier elements including first and second rectifier electrodes and a control electrode for initiating conduction between said rectifier electrodes, and control means for selectively controlling the conductivity of said rectifier elements to control the current applied therethrough to said output means, said control means including a firing circuit for each rectifier element including a condenser and a rectifier connected in series across said rectifier electrodes, and an electron discharge valve connected from said condenser to said control electrode, and a control circuit for selectively rendering said discharge valves of said firing circuit conducting, said control circuit including pulse developing means connected to each phase of the source for providing recurring pulses of opposite polarity symmetrically shifted in phase with respect to a regularly recurring center point, said pulse developing means connected to each phase of said source including means for providing from the voltage of the source a voltage wave of sinusoidal wave form, means for providing a direct current voltage which varies with the phase shift desired, means for providing a composite wave including said sinusoidal wave and said direct current voltage with the zero voltage points of said composite wave varying with the direct current voltage, means for producing positive and negative pulses as the composite wave approaches zero from positive and negative values respectively, with the positive and negative pulses being symmetrically shifted from the center point as the direct current voltage varies, and means for applying said pulses of opposite polarity to the firing circuits of said rectifier elements of opposite polarity connected to the associated phase of the source, said pulses controlling the conductivity of said valves of said firing circuits so that said valves and said condensers provide current to said control portions of said rectifier elements to render the same conducting, with the shift in phase of said pulses controlling the time of firing of said rectifier elements and thereby providing instantaneous control of the current in said output means.

8. A system for producing a controlled direct current voltage from a three phase power source including a pair of rectifier elements connected to each phase of said source with the element of each pair being connected in opposite polarities, inductor means connecting said rectifier elements to direct current output means, each of said rectifier elements including first and second rectifier electrodes and a control electrode for initiating conduction between said rectifier electrodes, and control means for selectively controlling the conductivity of said rectifier elements to control the current applied therethrough to said output means, said control means including a firing circuit for each rectifier element including condenser means and rectifier means connected in series across said rectifier electrodes, and an electron discharge valve connected from said condenser to said control electrode, and a control circuit for selectively rendering said discharge valves of said firing circuits conducting, said control circuit including pulse developing means connected to each phase of the source for providing recurring pulses of opposite polarity symmetrically shifted in phase with respect to a regularly recurring center point, pulse amplifier means connecting said pulse developing means to the firing circuits of said rectifier elements and providing symmetrically shifted pulses to said rectifier elements connected in opposite polarities to the associated phase of the source, said pulses controlling the conductivity of said valves of said firing circuits so that said valves and said condensers provide current to said control portions of said rectifier elements to render the same conducting, with the shift in phase of said pulses controlling the time of firing of said rectifier elements and thereby providing instantaneous control of the current in said output means.

9. A system for producing a controlled direct current voltage from a three phase power source including a pair of rectifier elements connected to each phase of said source with the element of each pair being connected in opposite polarities, inductor means for connecting said rectifier elements to direct current output means, each of said rectifier elements including first and second rectifier electrodes and a control electrode for initiating conduction between said rectifier electrodes, and control means for selectively controlling the conductivity of said rectifier elements to control the current applied therethrough to said output means, said control means including a firing circuit for each rectifier element including a condenser and a rectifier connected in series across said rectifier electrodes and an electron discharge valve connected from said condenser to said control electrode, and a control circuit for selectively rendering said discharge valves of said firing circuits conducting, said control circuit including pulse developing means connected to each phase of the source for providing recurring pulses of opposite polarity symmetrically shifted in phase with respect to a regularly recurring center point, first and second pulse amplifier means connecting each of said pulse developing means to the firing circuits of said rectifier elements connected to the associated phase of the source, said first pulse amplifier means providing a pulse to said firing circuit of said rectifier element of one polarity in response to a pulse of one polarity from said pulse developing means, said second pulse amplifier providing a pulse to said firing circuit of said rectifier element of opposite polarity in response to a pulse of opposite polarity from said pulse developing means, said pulses controlling the conductivity of said valves of said firing circuits so that said valves and said condensers provide current to said control portions of said rectifier elements to render the same conducting, with the shift in phase of said pulses controlling the time of firing of said rectifier elements and thereby providing instantaneous control of the current in said output means.

10. A system for producing recurring pulses of opposite polarity symmetrically shifted in phase with respect to a regularly recurring center point, including in combination, means for providing a voltage wave of sinusoidal wave form, means for providing a direct current voltage which varies with the phase shift desired, means for superimposing said sinusoidal wave on said direct current voltage to provide a composite wave having points of zero voltage which vary with said direct current voltage, a saturated amplifier having a grid and being biased to be rendered respectively conducting and non-conducting as the voltage applied to said grid passed from positive to negative through a very small voltage range, means for applying said composite wave to said grid of said saturated amplifier so that a square wave output is produced with the relative duration of the portions of different amplitudes varying with said direct current voltage, and a saturated transformer connected to the output of said saturated amplifier for producing positive and negative pulses as the square wave rises and falls respectively.

11. A system for deriving recurring pulses of opposite polarity symmetrically shifted in phase with respect to a regularly recurring center point, including in combination, means for providing a voltage wave of sinusoidal wave form, means for providing a direct current voltage which varies with the phase shift desired, means for superimposing said sinusoidal wave on said direct current voltage to provide a composite wave with the points of zero voltage varying with said direct current voltage, a saturated amplifier having a grid and being biased to be rendered respectively conducting and non-conducting as the voltage applied to said grid passed from positive to negative through a very small voltage range, means for applying said composite wave to said grid of said saturated amplifier so that a square wave output is produced with the relative duration of the portions of different amplitudes varying with said direct current voltage, a saturated transformer connected to the output of said saturated amplifier for producing positive and negative pulses as the square wave rises and falls respectively, and first and second pulse amplifiers connected to said transformer, said pulse amplifiers being connected so that said first amplifier provides amplified pulses in response to said positive pulses and said second amplifier provides amplified pulses in response to said negative pulses.

12. A system for producing recurring pulses of opposite polarity symmetrically shifted in phase with respect to a regularly recurring center point including in combination, means for providing a voltage wave of sinusoidal wave form, means for providing a direct current voltage which varies with the phase shift desired, means for providing a composite wave including said sinusoidal wave and said direct current voltage with the zero voltage points of said composite wave varying with the direct current voltage, means for providing a square wave having alternate portions corresponding in time to the positive and negative portions of said composite wave, and differentiating means for producing positive and negative pulses as the square wave rises and falls respectively, with the positive and negative pulses being symmetrically shifted from the center point as the direct current voltage varies.

13. A system for producing a controlled direct current from an alternating current potential supply having a center terminal and a plurality of outer terminals, said system including in combination, rectifier means including a pair of rectifier elements connected to each of the outer terminals of the potential supply with the elements of each pair being connected in opposite polarities, inductor means connecting said rectifier elements to direct current output means, which output means includes the center terminal of the potential supply, said rectifier elements including control portions for controlling the conductivity thereof, and control means connected to said control portions of said rectifier elements to control the current applied through said rectifier elements to said output means, said control means including a firing circuit connected to each rectifier control portion including an electron discharge valve, a condenser, and a circuit for charging said condenser from the potential supply, and a control circuit for selectively rendering said discharge valves of said firing circuit conducting, said control circuit including a pulse developing means associated with each outer terminal of the potential supply for providing recurring pulses of opposite polarity symmetrically shifted in phase with respect to a regularly recurring center point, said pulse developing means providing pulses of opposite polarity to the firing circuits of rectifier elements of opposite polarity connected to the associated outer terminal of the potential supply, said pulses controlling the conductivity of said valves of said firing circuits so that said valves and said condensers provide current to said control portions of said rectifier elements to render the same conducting, with the shift in phase of said pulses controlling the time of firing of said rectifier elements and thereby providing instantaneous control of current at said output means.

14. A system for producing a controlled direct current from an alternating current potential supply having a center terminal and a plurality of outer terminals, said system including in combination, rectifier means including a pair of rectifier elements connected to each of the outer terminals of the potential supply with the elements of each pair being connected in opposite polarities, inductor means connecting said rectifier elements to direct current output means, which output means includes the center terminal of the potential supply, said rectifier elements including control portions for controlling the conductivity thereof, and control means connected to said control portions of said rectifier elements to control the current applied through said rectifier elements to said output means, said control means including a firing circuit connected to each rectifier control portion including an electron discharge valve, and a control circuit for selectively rendering said discharge valves of said firing circuit conducting, said control circuit including a plurality of pulse developing means connected to the potential supply for providing recurring pulses symmetrically shifted in phase in opposite directions with respect to a regularly recurring center point on the voltage wave at each outer terminal of the potential supply, said pulse developing means applying such pulses to the firing circuits of rectifier elements of opposite polarity connected to the associated outer terminal of the potential supply, said control circuit means including condenser means for applying said pulses to said valves so that said valves conduct to activate said firing circuits to render said rectifier elements conducting, said condenser means charging from said pulses to cut off said valves at the end of said pulses, and means for discharging said condenser means so that the next pulses are applied therethrough to render said valves conducting, with the shift in phase of said pulses controlling the time of firing of said rectifier elements and thereby providing instantaneous control of current at said output means.

15. A system for producing a controlled direct current from an alternating current potential supply having a center terminal and a plurality of outer terminals, said system including in combination, rectifier means including a pair of rectifier elements for each outer terminal of the potential supply, each of said rectifier elements including first and second rectifier electrodes of opposite polarities and control means for controlling conduction between said rectifier electrodes, inductor means including first and second portions with a common center terminal and first and second end terminals, said first rectifier electrode of one rectifier element and said second rectifier electrode of the other rectifier element of each pair being connected to the associated outer terminals of said potential supply, the first rectifier electrodes of said rectifier elements not connected to the potential supply terminals being connected to said first end terminal of said inductor means, and the second rectifier electrodes of said rectifier elements not connected to the potential supply terminals being connected to said second end terminal of said inductance means, and a control circuit connected to said control means of said rectifier elements for selectively providing a conducting path between the rectifier electrodes thereof, said control circuit including a plurality of pulse developing means connected to the potential supply for providing recurring pulses symmetrically shifted in phase in opposite directions from a regularly recurring point on the voltage wave at each outer terminal of the potential supply, each of said pulse developing means applying such pulses to said control means of said pair of rectifier elements connected to the associated outer terminal of the potential supply to provide a conducting path between said rectifier electrodes thereof, with the shift in phase of said pulses controlling the time of firing of said rectifier means and thereby providing instantaneous control of current at said output means.

References Cited in the file of this patent

UNITED STATES PATENTS

| | | |
|---|---|---|
| 2,264,175 | Dawson | Nov. 25, 1941 |
| 2,431,083 | Sciaky | Nov. 18, 1947 |
| 2,508,467 | Parsons et al. | May 23, 1950 |
| 2,600,519 | Solomon | June 17, 1952 |
| 2,640,180 | Parsons | May 26, 1953 |
| 2,728,046 | Sciaky | Dec. 20, 1955 |

FOREIGN PATENTS

| | | |
|---|---|---|
| 895,022 | Germany | Oct. 29, 1953 |